(12) United States Patent
Lee et al.

(10) Patent No.: US 12,724,336 B2
(45) Date of Patent: Sep. 1, 2026

(54) HEAT DISSIPATION MODULE AND PROJECTION APPARATUS

(71) Applicant: Coretronic Corporation, Hsin-Chu (TW)

(72) Inventors: Po-Han Lee, Hsin-Chu (TW); Chih-Sheng Wu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 722 days.

(21) Appl. No.: 18/087,830

(22) Filed: Dec. 23, 2022

(65) Prior Publication Data

US 2023/0221627 A1 Jul. 13, 2023

(30) Foreign Application Priority Data

Jan. 10, 2022 (CN) ......................... 202220048636.3

(51) Int. Cl.
*G03B 21/16* (2006.01)
*F28D 15/02* (2006.01)

(52) U.S. Cl.
CPC ......... *G03B 21/16* (2013.01); *F28D 15/0275* (2013.01)

(58) Field of Classification Search
CPC ............................ G03B 21/16; F28D 15/0275
USPC ............................................................ 353/52
See application file for complete search history.

(56) References Cited

U.S. PATENT DOCUMENTS 10,705,414 B2 7/2020 Okada et al.
2005/0270747 A1* 12/2005 Rogers ................. H04N 9/3141 348/E5.143
2009/0086171 A1* 4/2009 Sun ...................... H04N 9/3144 359/223.1

FOREIGN PATENT DOCUMENTS

CN 209118042 7/2019
JP 2004077883 A * 3/2004
KR 100553192 B1 * 2/2006 .............. G06F 1/20

OTHER PUBLICATIONS

Translation of 2004077883 (Year: 2025).*
Translation of 100553192 (Year: 2025).*

* cited by examiner

*Primary Examiner* — Jerry L Brooks
(74) *Attorney, Agent, or Firm* — JCIPRNET

(57) ABSTRACT

A heat dissipation module for dissipating heat from a heat source of a projection apparatus includes a thermoelectric module, a heat dissipation member, an absorption material, a transmission member and an insulating material. The thermoelectric module is disposed between the heat source and the heat dissipation member and has a cold side and a hot side opposite to each other, where the cold side is for dissipating heat from the heat source, and the hot side contacts with the heat dissipation member. The transmission member has a connection end and an evaporation end, wherein the connection end connects with the absorption material. The insulating material covers the absorption material and the transmission member. A projection apparatus uses the heat dissipation module. The heat dissipation module and the projection apparatus can prevent possibility of condensed moisture flowing into the system to damage electronic devices, and therefore have higher structural reliability.

10 Claims, 5 Drawing Sheets

HEAT DISSIPATION MODULE AND PROJECTION APPARATUS

CROSS-REFERENCE TO RELATED APPLICATION

This application claims the priority benefits of Chinese Patent Application Serial No. 202220048636.3, filed on Jan. 10, 2022. The entirety of the above-mentioned patent application is hereby incorporated by reference herein and made a part of this specification.

FIELD OF THE INVENTION

This invention relates to a heat dissipation module, and a projection apparatus including the same, particularly to a heat dissipation module capable of removing condensed moisture, and a projection apparatus using such heat dissipation module.

DESCRIPTION OF RELATED ART

Currently, thermoelectric modules are used in projectors to dissipate heat, wherein the thermoelectric module is surrounded by a cover material to block the outer air and prevent moisture condensation in an air-tight manner. However, when the electric power of the thermoelectric module is larger, the difference between the temperature of the surface of the cold side of the thermoelectric module and that of the outer air becomes overly large, the conventional method has the problems below. First, as being limited by the structure and the covering space when supported on the optical engine, the air-tightness in assembling may be insufficient to cause moisture condensation. Second, the air-tightness in assembling is easily affected by the assembling method and the dimensional tolerance of the material itself and therefore is difficult to be uniform, so an additional system is required to actively remove condensed moisture and compensate for the insufficient air-tightness of the conventional design. That is, when the electric power of the thermoelectric module is larger, the temperature of the surface of the cold side is lower than the dew point so that moisture is condensed on the surface. Even if a cover material is used to prevent contact with the outer air, condensed moisture may still be formed due to the assembling or material to cause short circuit and damage of electronic devices (such as light valve) in the system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

This invention provides a heat dissipation module that is capable of removing condensed moisture effectively.

This invention provides a projection apparatus that includes the above heat dissipation module to be capable of removing condensed moisture effectively and thereby prevents condensed moisture from flowing into the system to cause short circuit and damage of electronic devices and thus has higher structural reliability.

To achieve one or part or all of the above objects or other objects, an embodiment of this invention provides a heat dissipation module for dissipating heat from the heat source of a projection apparatus. The heat dissipation module includes a thermoelectric module, a heat dissipation member, an absorption material, a transmission member and an insulating material. The thermoelectric module is disposed between the heat source and the heat dissipation member, and has a cold side and a hot side opposite to each other, wherein the cold side is for dissipating heat from the heat source, and the hot side contacts with the heat dissipation member. The transmission member has a connection end and an evaporation end, wherein the connection end connects with the absorption material. The insulating material covers the absorption material and the transmission member.

In an embodiment of this invention, the heat dissipation module further includes an electric fan arranged between the connection end and the evaporation end of the transmission member, wherein the wind flow of the electric fan blows toward the evaporation end.

In an embodiment of this invention, the heat dissipation module further includes a heater arranged between the connection end and the evaporation end of the transmission member, wherein a heat flow generated by the heater blows toward the evaporation end.

In an embodiment of this invention, the heat dissipation module further includes a plurality of fasteners that pass through the heat dissipation member, the insulating material and the absorption material to fix the heat dissipation member on the heat source.

In an embodiment of this invention, the above transmission member comprises a capillary structure or fireproof cotton.

In an embodiment of this invention, the relative humidity at the evaporation end of the transmission member is lower than that at the region where the thermoelectric module is disposed.

In an embodiment of this invention, the temperature at the evaporation end of the transmission member is higher than that at the region where the thermoelectric module is disposed.

In an embodiment of this invention, the heat dissipation module further includes a boss contacting with the thermoelectric module and the heat source, wherein heat is conducted from the heat source to the cold side of the thermoelectric module through the boss to be dissipated.

To achieve one or part or all of the above objects or other objects, an embodiment of this invention also provides a projection apparatus, which includes a housing, a projection lens, a heat source and a heat dissipation module. The housing has at least one air inlet and at least one air outlet. The projection lens is coupled to the housing. The heat source and the heat dissipation module are disposed within the housing. The heat dissipation module includes a thermoelectric module, a heat dissipation member, an absorption material, a transmission member and an insulating material. The thermoelectric module is disposed between the heat source and the heat dissipation member, and has a cold side and a hot side opposite to each other, wherein the cold side is for dissipating heat from the heat source, and the hot side contacts with the heat dissipation member. The transmission member has a connection end and an evaporation end, wherein the connection end connects with the absorption material, and the evaporation end is arranged between the heat dissipation member and the at least one air outlet. The insulating material covers the absorption material and the transmission member.

In an embodiment of this invention, the heat source is an optical engine.

Accordingly, an embodiment of this inventions has at least one of the following merits or effects. In the design of the heat dissipation module of this invention, the cold side of the thermoelectric module serves to dissipate heat from the heat source, the connection end of the transmission member connects with the absorption material, and the insulating material covers the absorption material and the transmission member. Thereby, the condensed moisture formed on the cold side due to temperature difference can be absorbed by the absorption material, and the condensed moisture absorbed by the absorption material can be transmitted to the evaporation end through the transmission member to be removed or evaporated, so the condensed moisture can be prevented from flowing into the system effectively. Moreover, the insulating material covering the absorption material and the transmission member can effectively prevent the condensed moisture from evaporating or flowing out from the transmission path to prevent the moisture from staying inside the system. In addition, the projection apparatus using the instant heat dissipation module has a higher structural reliability because the instant heat dissipation module can effectively remove condensed moisture to prevent possibility of condensed moisture flowing into the system to cause short circuit and damage of electronic devices.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
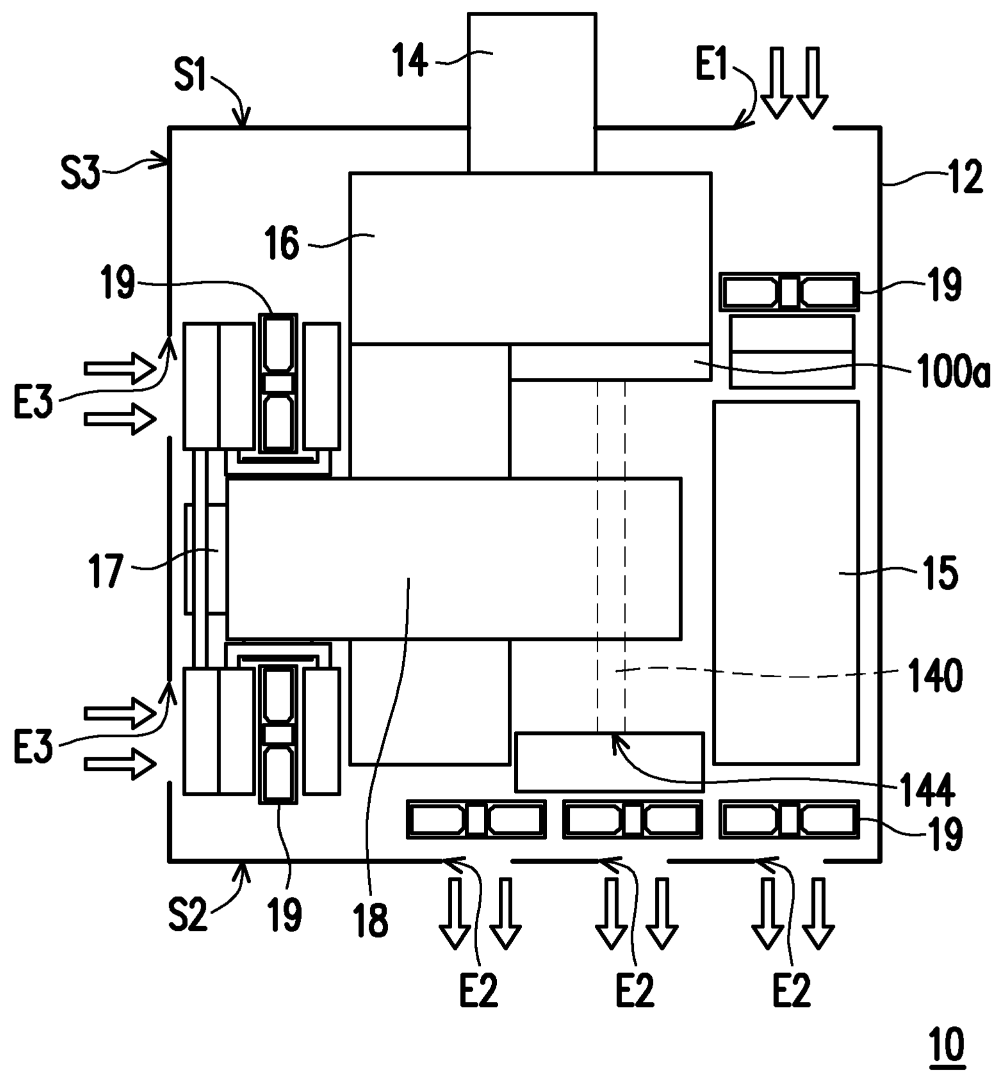
FIG. 1 is a schematic diagram of a projection apparatus according to an embodiment of this invention.
Figure 2:
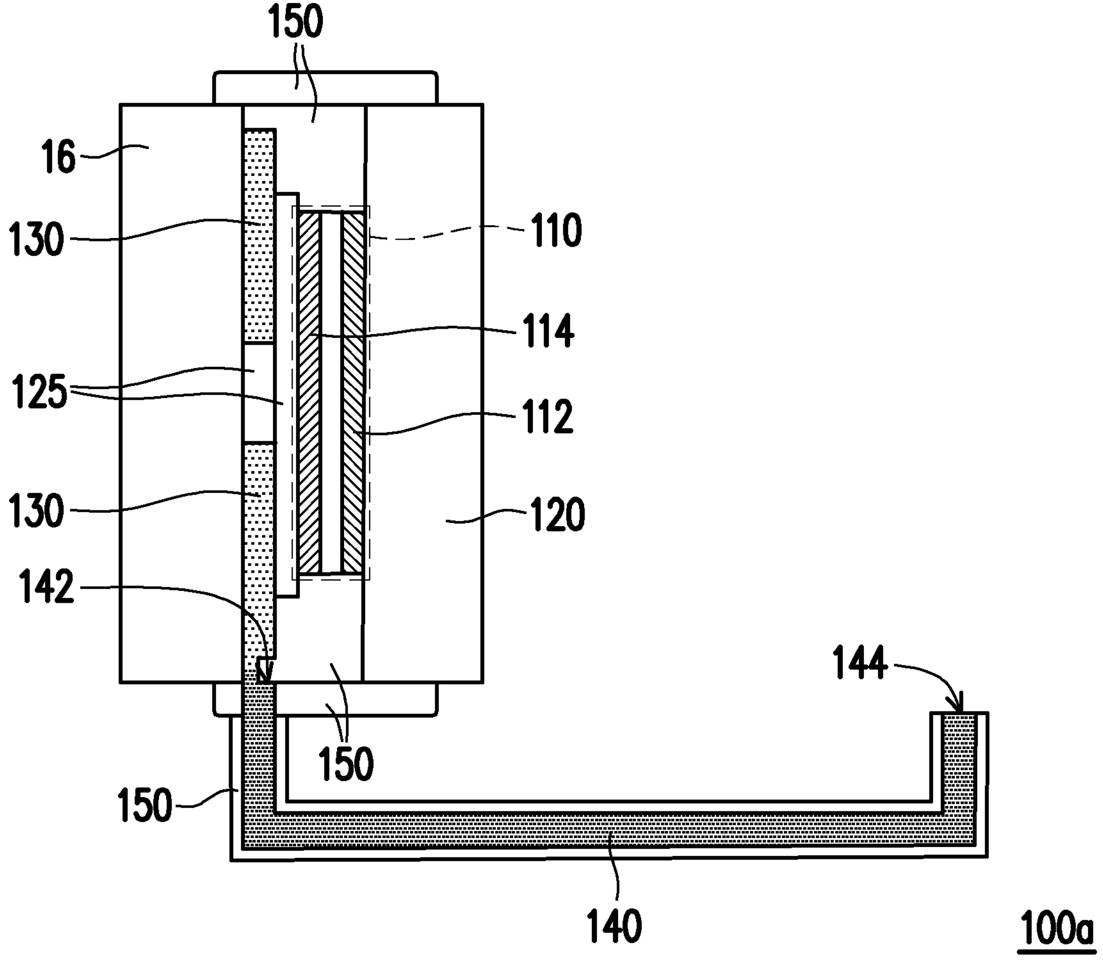
FIG. 2 is a schematic diagram of the heat dissipation module in the projection apparatus of FIG. 1.

FIG. 1 is a schematic diagram of a projection apparatus according to an embodiment of this invention. FIG. 2 is a schematic diagram of the heat dissipation module in the projection apparatus of FIG. 1. Referring to FIG. 1 first, in this embodiment, the projection apparatus 10 includes a housing 12, a projection lens 14, a heat source 16 and a heat dissipation module 100*a*. The housing 12 has at least one air inlet (two air inlets E1 and E3 are depicted schematically) and at least one air outlet (one air outlet E2 is depicted schematically), and has a first side S1, a second side S2, and a third side S3 vertically connecting the first side S1 and the second side S2. The air inlet E1 and the air outlet E2 are located at the first side S1 and the second side S2, respectively, and the air inlet E3 is located at the third side S3. The projection lens 14 is coupled to the housing 12, and the heat source 16 and the heat dissipation module 100*a* are disposed inside of the housing 12. Here, the heat source 16 is embodied as an optical engine, especially the light valve (Digital Micromirror Device, DMD) in the optical engine, but is not limited thereto.

As shown in FIG. 1, the projection apparatus 10 of this embodiment further includes a power source unit 15, a light source unit 17, a light transmission unit 18, and a plurality of system electric fans 19. The power source unit 15 is disposed in the housing 12 and arranged between the air inlet E1 and the air outlet E2. The light source unit 17 and the light transmission unit 18 are disposed in the housing 12, wherein the light source unit 17 is near the air inlet E3 and faces the light transmission unit 18 to emit illumination light beams. The heat source 16 is arranged between the projection lens 14 and the light transmission unit 18, wherein the light transmission unit 18 is disposed in the light transmission path of the illumination beams to transmit the illumination beams to the heat source 16 (the optical engine). The projection lens 14 is coupled to the heat source 16 and serves to project image light beams outside of the housing 12. The system electric fans 19 are disposed inside of the housing 12 near the air inlets E1 and E3 and the air outlet E2, respectively.

The light source unit 17 may include a light-emitting diode (LED) or a laser diode (LD), for example, to emit an illumination beam. The light transmission unit 18 may be a dichroic mirror or a combination thereof, serving to provide the illumination beams to the light valve. The projection lens 14 may include, for example, one optical lens having a diopter, or a combination of plural optical lenses having diopters, such as various combinations including non-planar lenses such as biconcave lens, biconvex lens, concave-convex lens, convex-concave lens, plano-convex lens and plano-concave lens. In an embodiment, the projection lens 14 may also include a planar optical mirror to project the image light beams to a projection target in a reflection manner.

Referring to FIGS. 1-2, the heat dissipation module 100*a* of this embodiment serves to dissipate heat from the heat source 16 of the projection apparatus 10, including a thermoelectric module 110, a heat dissipation member 120, an absorption material 130, a transmission member 140 and an insulating material 150. The thermoelectric module 110 is disposed between the heat source 16 and the heat dissipation member 120, and has a cold side 114 and a hot side 112 opposite to each other, where the cold side 114 is for dissipating heat from the heat source 16, and the hot side 112 contacts with the heat dissipation member 120. The transmission member 140 has a connection end 142 and an evaporation end 144, wherein the connection end 142 connects with the absorption material 130, and the evaporation end 144 is arranged between the heat dissipation member 120 and the air outlet E2. The insulating material 150 covers the absorption material 130 and the transmission member 140.

Specifically, the heat dissipation module 100*a* also includes a boss 125, which contacts with the thermoelectric module 110 and the heat source 16. Heat is conducted from the heat source 16 to the cold side 114 of the thermoelectric module 110 though the boss 125 to be dissipated. That is, in this embodiment, the heat source 16 does not directly contact with the thermoelectric module 110, but indirectly connects with the thermoelectric module 110 via the boss 125. As shown in FIG. 2, in this embodiment, the absorption material 130 is embodied to be disposed between a part of the boss 125 and the heat source 16, wherein the absorption material 130 contacts with the cold side 114 of the thermoelectric module 110 and therefore is capable of absorbing condensed moisture formed on the cold side 114 having a temperature lower than the dew point and encountering air with higher humidity to prevent the condensed moisture from flowing into the system. Here, the absorption material 130 may be a nonwoven fabric or a foam, but is not limited thereto. Moreover, the insulating material 150 covers the absorption material 130 and extends to cover parts of the heat source 16 and the heat dissipation member 120, wherein the insulating material 150 may be a rubber, but is not limited thereto.

Particularly, the transmission member 140 has a connection end 142 connecting with the absorption material 130, and therefore is capable of transmitting the condensed moisture absorbed in the absorption material 130 to the evaporation end 144 to remove or evaporate the moisture. Preferably, the transmission member 140 may include a capillary structure or fireproof cotton, but is not limited thereto. That is, the transmission member 140 transmits the condensed moisture absorbed in the absorption material 130 to the evaporation end 144 through the capillary phenomenon, for removal or evaporation of the moisture. Here, the relative humidity at the evaporation end 144 of the transmission member 140 is lower than the relative humidity at the region where the thermoelectric module 110 is disposed, or, the temperature at the evaporation end 144 of the transmission member 140 is higher than the temperature at the region where the thermoelectric module 110 is disposed. In other words, the evaporation end 144 can be arranged in a region having a relatively lower humidity or relatively higher temperature for evaporating moisture into the air.

In addition, in order to make the moisture not evaporate from the transmission member 140 until being transmitted to the evaporation end 144, the insulating material 150 covers the circumferential surface of the transmission member 140 but does not cover the evaporation end 144. Thereby, the transmission member 140 is prevented from releasing the moisture by evaporation or flowing in the transmission path to allow moisture to stay in the system.

Briefly speaking, in the design of the heat dissipation module 100*a*, the cold side 114 of the thermoelectric module serves to dissipate heat from the heat source 16, the connection end 142 of the transmission member 140 connects with the absorption material 130, and the insulating material 150 covers the absorption material 130 and the transmission member 140. Thereby, the absorption material 130 can absorb the condensed moisture formed on the cold side 114 due to temperature difference, and the transmission member 140 can transmit the moisture absorbed in the absorption material 130 to the evaporation end 144 for removal or evaporation, so that the condensed moisture is effectively prevented from flowing into the system. Moreover, the insulating material 150 covering the absorption material 130 and the transmission member 140 can effectively prevent the condensed moisture from evaporate or flow out from the transmission path to prevent moisture from staying in the system. In addition, the projection apparatus 10 using the heat dissipation module 100*a* of this embodiment can have higher structural reliability because the heat dissipation module 100*a* can effectively remove condensed moisture to prevent possibility of condensed moisture flowing into the system to cause short circuit and damage of electronic devices.

More embodiments of this invention are given below. It is noted that the descriptions of these embodiments use the reference characters of elements and some contents of the above embodiment, wherein the same reference characters are used to represent the same or similar elements, and descriptions of the same technical contents are omitted.

Figure 3:
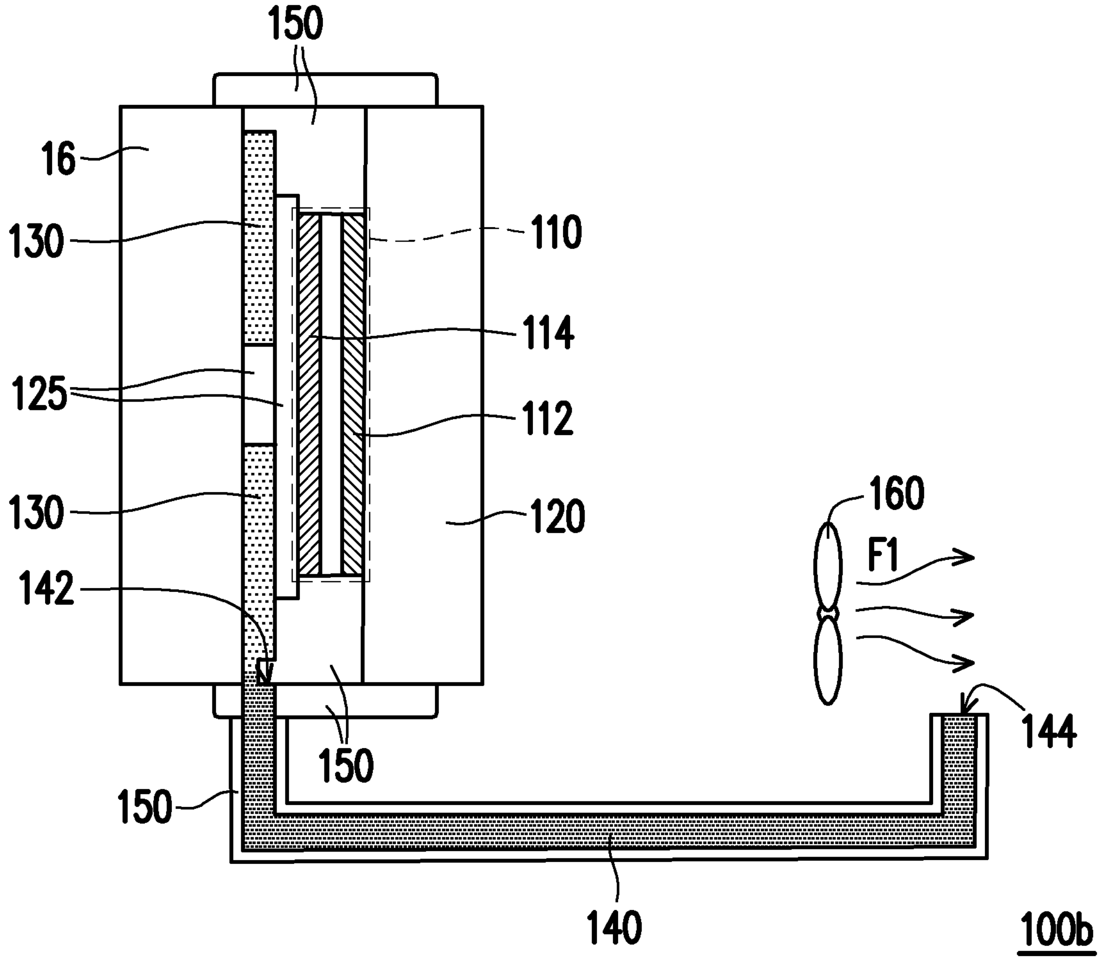
FIG. 3 is a schematic diagram of a heat dissipation module according to an embodiment of this invention.

FIG. 3 is a schematic diagram of a heat dissipation module according to an embodiment of this invention. Referring to FIGS. 2-3, the heat dissipation module 100*b* of this embodiment is similar to the heat dissipation module 100*a* as shown in FIG. 2, and is different from the latter in further including an electric fan 160 arranged between the connection end 142 and the evaporation end 144 of the transmission member 140. The wind flow F1 from the electric fan 160 blows toward the evaporation end 144 to promote evaporation of the moisture. Because an electric fan 160 is disposed at upstream of the evaporation end 144 to form a wind flow F1 over the evaporation end 144, and the air outlet E2 of the housing 12 is under the evaporation end 144 (see FIG. 1), the evaporated moisture can be directly discharged outside of the system through the wind flow F1.

Figure 4:
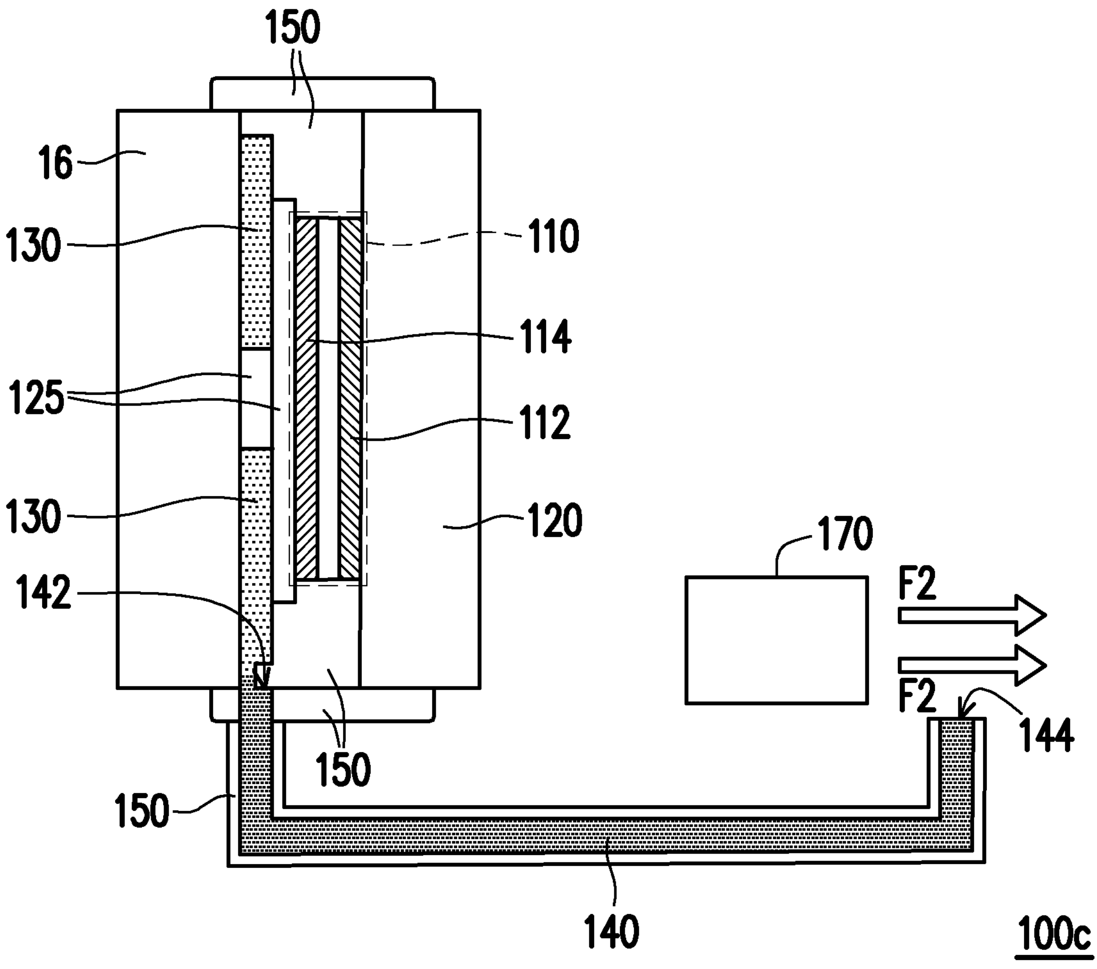
FIG. 4 is a schematic diagram of a heat dissipation module according to another embodiment of this invention.

FIG. 4 is a schematic diagram of a heat dissipation module according to another embodiment of this invention. Referring to both FIG. 2 and FIG. 4, the heat dissipation module 100*c* of this embodiment is similar to the heat dissipation module 100*a* as shown in FIG. 2, and is different from the latter in further including a heater 170 arranged between the connection end 142 and the evaporation end 144 of the transmission member 140. The heat flow F2 generated by the heater 170 blows toward the evaporation end 144 to promote evaporation of the moisture. That is, in this embodiment, the heat flow F2 generated by the heater 170 carries the moisture having evaporated from evaporation end 144 outside of the system while being driven by the flow field in the system.

Figure 5:
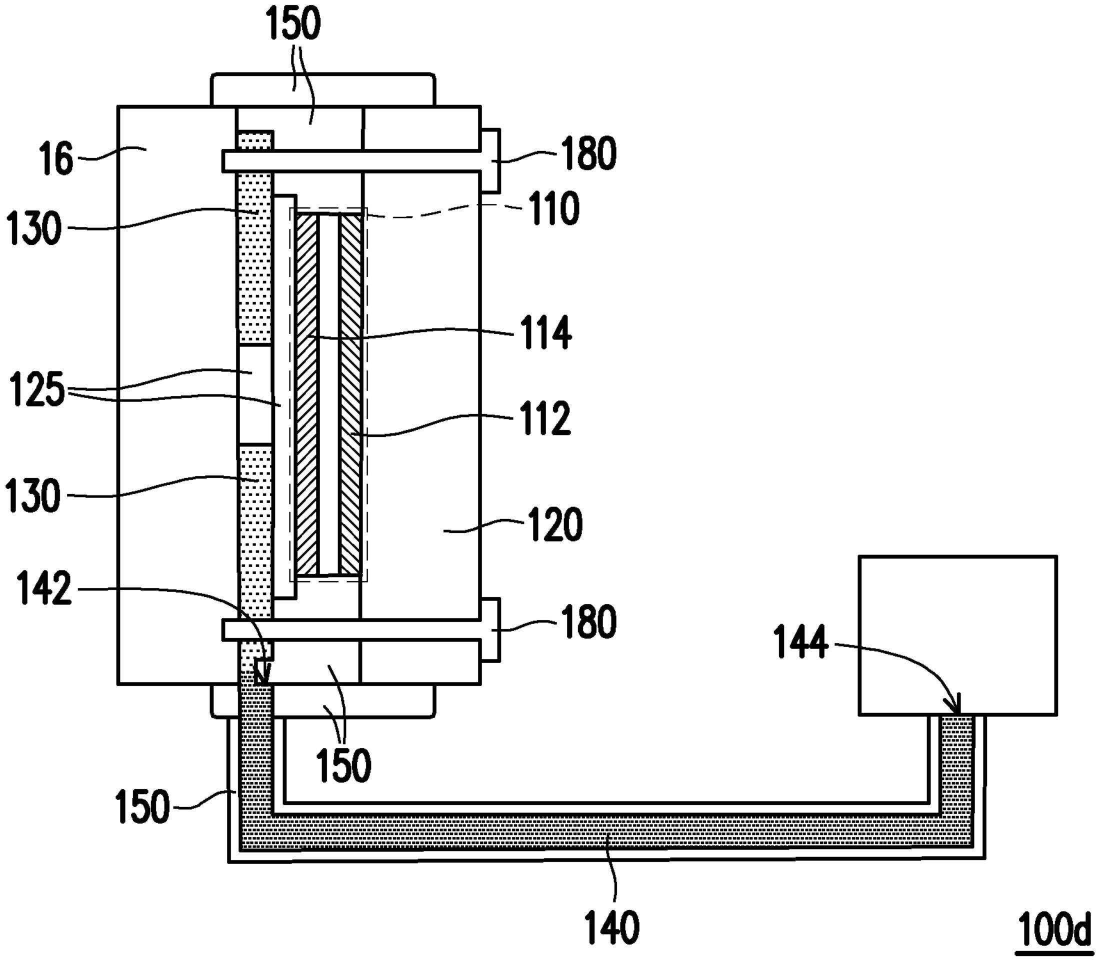
FIG. 5 is a schematic diagram of a heat dissipation module according to still another embodiment of this invention.

FIG. 5 is a schematic diagram of a heat dissipation module according to still another embodiment of this invention. Referring to both FIG. 2 and FIG. 5, the heat dissipation module 100*d* of this embodiment is similar to the heat dissipation module 100*a* as shown in FIG. 2, and is different from the latter in further including a plurality of fasteners 180, which pass through the heat dissipation member 120, the insulating material 150 and the absorption material 130 to fix the heat dissipation member 120 on the heat source 16.

In summary, Accordingly, an embodiment of this inventions has at least one of the following merits or effects. In the design of the heat dissipation module of this invention, the cold side of the thermoelectric module serves to dissipate heat from the heat source, the connection end of the transmission member connects with the absorption material, and the insulating material covers the absorption material and the transmission member. Thereby, the condensed moisture formed on the cold side due to temperature difference can be absorbed by the absorption material, and the condensed moisture absorbed by the absorption material can be transmitted to the evaporation end through the transmission member to be removed or evaporated, so the condensed moisture can be prevented from flowing into the system effectively. Moreover, the insulating material covering the absorption material and the transmission member can effectively prevent the condensed moisture from evaporating or flowing out from the transmission path to prevent the moisture from staying inside the system. In addition, the projection apparatus using the heat dissipation module of this invention can have higher structural reliability because the heat dissipation module can effectively remove condensed moisture to prevent possibility of condensed moisture flowing into the system to cause short circuit and damage of electronic devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

The invention claimed is:

1. A heat dissipation module for dissipating heat from a heat source of a projection apparatus, comprising a thermoelectric module, a heat dissipation member, an absorption material, a transmission member and an insulating material, wherein the thermoelectric module is disposed between the heat source and the heat dissipation member and has a cold side and a hot side opposite to each other, where the cold side is for dissipating heat from the heat source, and the hot side contacts with the heat dissipation member, the transmission member has a connection end and an evaporation end, wherein the connection end connects with the absorption material, and the insulating material covers at least part of the absorption material and encloses at least part of the transmission member, and extends to cover parts of the heat dissipation member.

2. A heat dissipation module for dissipating heat from a heat source of a projection apparatus, comprising a thermoelectric module, a heat dissipation member, an absorption material, a transmission member, an insulating material, and an electric fan, wherein the thermoelectric module is disposed between the heat source and the heat dissipation member and has a cold side and a hot side opposite to each other, where the cold side is for dissipating heat from the heat source, and the hot side contacts with the heat dissipation member, the transmission member has a connection end and an evaporation end, wherein the connection end connects with the absorption material, and the insulating material covers at least part of the absorption material and encloses at least part of the transmission member, the electric fan is arranged between the connection end and the evaporation end of the transmission member, wherein a wind flow of the electric fan blows toward the evaporation end.

3. A heat dissipation module for dissipating heat from a heat source of a projection apparatus, comprising a thermoelectric module, a heat dissipation member, an absorption material, a transmission member, an insulating material and a heater, wherein the thermoelectric module is disposed between the heat source and the heat dissipation member and has a cold side and a hot side opposite to each other, where the cold side is for dissipating heat from the heat source, and the hot side contacts with the heat dissipation member, the transmission member has a connection end and an evaporation end, wherein the connection end connects with the absorption material, and the insulating material covers at least part of the absorption material and encloses at least part of the transmission member, the heater is arranged between the connection end and the evaporation end of the transmission member, wherein a heat flow generated by the heater blows toward the evaporation end.

4. The heat dissipation module of claim 1, further comprising:

a plurality of fasteners, passing through the heat dissipation member, at least part of the insulating material and the absorption material to fix the heat dissipation member on the heat source.

5. The heat dissipation module of claim 1, wherein the transmission member comprises a capillary structure or fireproof cotton.

6. The heat dissipation module of claim 1, wherein a relative humidity at the evaporation end of the transmission member is lower than a relative humidity at a region where the thermoelectric module is disposed.

7. The heat dissipation module of claim 1, wherein a temperature at the evaporation end of the transmission member is higher than a temperature at a region where the thermoelectric module is disposed.

8. The heat dissipation module of claim 1, further comprising:

a boss, contacting with the thermoelectric module and the heat source, wherein heat is conducted from the heat source to the cold side of the thermoelectric module through the boss to be dissipated.

9. A projection apparatus, comprising: a housing, a projection lens, a heat source and a heat dissipation module, wherein the housing has at least one air inlet and at least one air outlet, the projection lens is coupled to the housing, the heat source and the heat dissipation module are disposed within the housing, and the heat dissipation module comprises a thermoelectric module, a heat dissipation member, an absorption material, a transmission member and an insulating material, wherein the thermoelectric module is disposed between the heat source and the heat dissipation member and has a cold side and a hot side opposite to each other, where the cold side is for dissipating heat from the heat source, and the hot side contacts with the heat dissipation member, the transmission member has a connection end and an evaporation end, wherein the connection end connects with the absorption material, and the evaporation end is arranged between the heat dissipation member and the at least one air outlet, the insulating material covers at least part of the absorption material and encloses at least part of the transmission member, and extends to cover parts of the heat dissipation member.

10. The projection apparatus of claim 9, wherein the heat source is an optical engine.

* * * * *